United States Patent [19]
Okafuji et al.

[11] Patent Number: 5,328,495
[45] Date of Patent: Jul. 12, 1994

[54] FLOAT-BATH RIBBON-WIDTH CONTROL METHOD AND SYSTEM

[75] Inventors: Masaharu Okafuji; Junichi Noguchi, both of Ichihara; Tomizo Otsuki, Osaka, all of Japan

[73] Assignee: Nippon Sheet Glass Co., Ltd., Osaka, Japan

[21] Appl. No.: 847,093

[22] PCT Filed: Sep. 25, 1991

[86] PCT No.: PCT/JP91/01276
§ 371 Date: Apr. 13, 1992
§ 102(e) Date: Apr. 13, 1992

[87] PCT Pub. No.: WO92/05120
PCT Pub. Date: Apr. 2, 1992

[30] Foreign Application Priority Data
Sep. 26, 1990 [JP] Japan ................ 2-256683
Sep. 24, 1991 [JP] Japan ................ 3-243066

[51] Int. Cl.$^5$ ................ C03B 18/04; G06F 15/46
[52] U.S. Cl. ................ 65/99.5; 65/99.6; 65/182.4; 65/DIG. 13; 364/473
[58] Field of Search ............ 65/99.5, 99.6, 182.4, 65/DIG. 13; 364/473

[56] References Cited
U.S. PATENT DOCUMENTS

| | | | |
|---|---|---|---|
| 4,004,900 | 1/1977 | Staahl, Jr. et al. | 65/99.5 |
| 4,030,902 | 6/1977 | Nagae | 65/99.5 |
| 4,306,898 | 12/1981 | Masuda et al. | 65/182.4 |
| 4,312,656 | 1/1982 | Masuda et al. | 65/182.4 |
| 4,337,076 | 6/1982 | Shaw, Jr. | 65/99.5 |

FOREIGN PATENT DOCUMENTS

| | | |
|---|---|---|
| 2282408 | 3/1976 | France . |
| 54-15689 | 6/1979 | Japan . |
| 59-19888 | 5/1984 | Japan . |
| 64-91218 | 4/1989 | Japan . |
| 1493689 | 11/1977 | United Kingdom . |
| 2050650 | 1/1981 | United Kingdom . |

*Primary Examiner*—W. Gary Jones
*Assistant Examiner*—Steven P. Griffin
*Attorney, Agent, or Firm*—Ratner and Prestia

[57] ABSTRACT

The width of glass ribbon at the hot end of a float bath is controlled to a constant value by raising and lowering a tweel for adjusting the flow of molten glass blank from a smelting furnace to the float bath. The controlled value of the tweel is obtained from predetermined control variables through fuzzy inference. This method is carried out in a float-bath ribbon-width control system using a fuzzy inference means that obtains the controlled value of the tweel from predetermined control variables through fuzzy inference.

8 Claims, 6 Drawing Sheets

FLOAT-BATH RIBBON-WIDTH CONTROL METHOD AND SYSTEM

DESCRIPTION

1. Technical Field

This invention relates generally to a method and system for controlling the width of glass ribbon in a float bath, and more particularly to a method and system for controlling the width of ribbon in the float bath using fuzzy control.

2. Background Art

Figure 1:
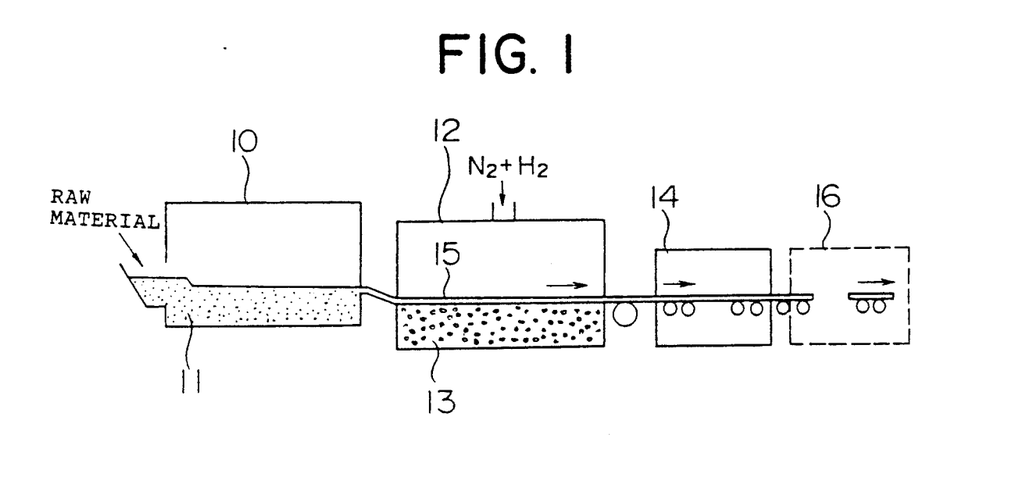
FIG. 1 is a flow diagram of a float-glass manufacturing process.

Transparent plate glass for building window panes or automotive windshields is usually manufactured by the so-called float process. As shown in FIG. 1, the float process for manufacturing plate glass consists of a smelting furnace 10 for melting raw materials to produce molten glass blank of consistent quality, a float bath 12 for forming molten glass into a plate shape, a Lehr(or annealing oven) 14 for annealing the formed plate glass, and a cutting section 16 for cutting the plate glass into cut-lengths and packaging them for shipment.

The float process is a plate-glass manufacturing method in which molten glass 11 is poured on a surface of molten metal (such as tin) 13 to obtain plate glass of a uniform thickness. This process was invented by an Englishman named Alastair Pilkinton in 1952.

Float glass manufactured by the float process is soda-lime glass consisting chiefly of 72% siliceous sand and 14% soda, for example. As the molten glass blank in the smelting furnace 10 is poured on the tin bath 12 while controlling the flow rate thereof, the molten glass spreads over the molten tin surface, and becomes a glass ribbon 15 having an equilibrium thickness of approximately 7 mm at a point where the surface tensions of glass, tin and atmosphere gas ($N_2$ gas + $H_2$ gas) at their respective interfaces, and the buoyancies and own weights of glass and tin are balanced. The ribbon of an equilibrium thickness is kept at a temperature suitable for the manufacture of plate glass (800°-900° C.), and slowly drawn into a plate of predetermined thickness and width, using care not to cause distortions.

Thus, the float process is divided into the following five steps:

① Pouring molten glass from the furnace onto the bath
   Spout (the region where molten glass flow is controlled)
② Reducing the molten glass ribbon to a uniform thickness on the molten tin
   Hot end (the region where glass thickness is made uniform)
③ Controlling the thickness of the molten glass ribbon while maintaining the ribbon temperature at a plate-making temperature
   Forming zone (the region where the blank is formed)
④ Cooling the formed glass ribbon
   Cooling end (the region where the formed glass ribbon is cooled)
⑤ Drawing the glass ribbon out of the tin bath
   Lift-out (the region where the glass ribbon is drawn out)

Float glass of thicknesses from 0.7 mm to 20.0 mm is manufactured by following the above steps.

Figure 2:
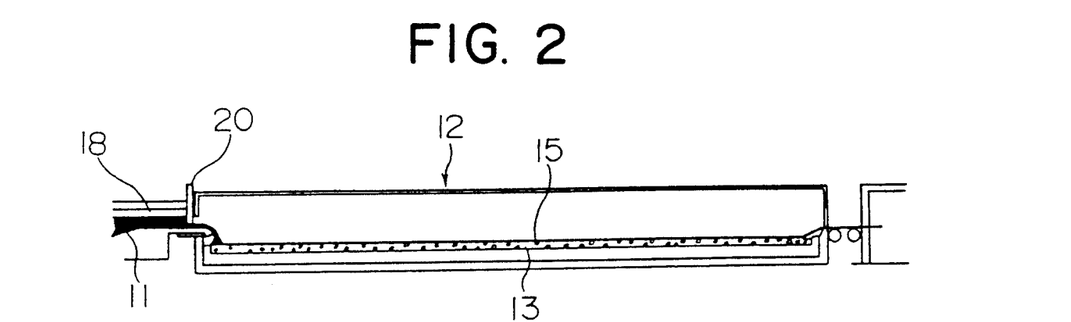
FIG. 2 is a cross-section of a float bath.
Figure 3:
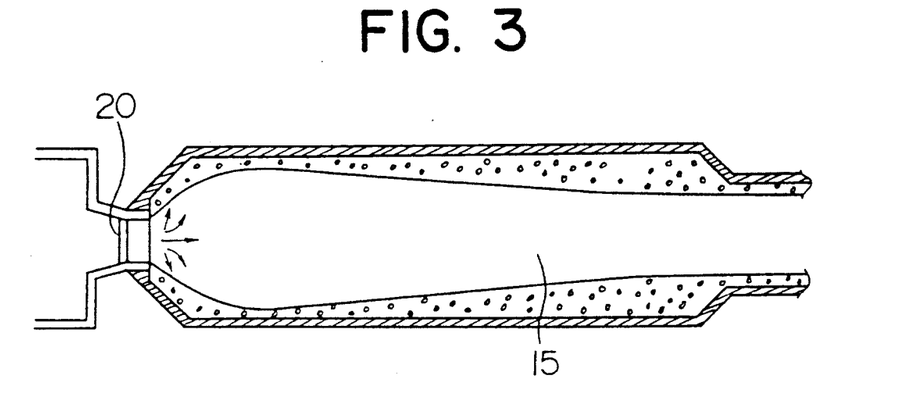
FIG. 3 is a plan view of the float bath.
Figure 4:
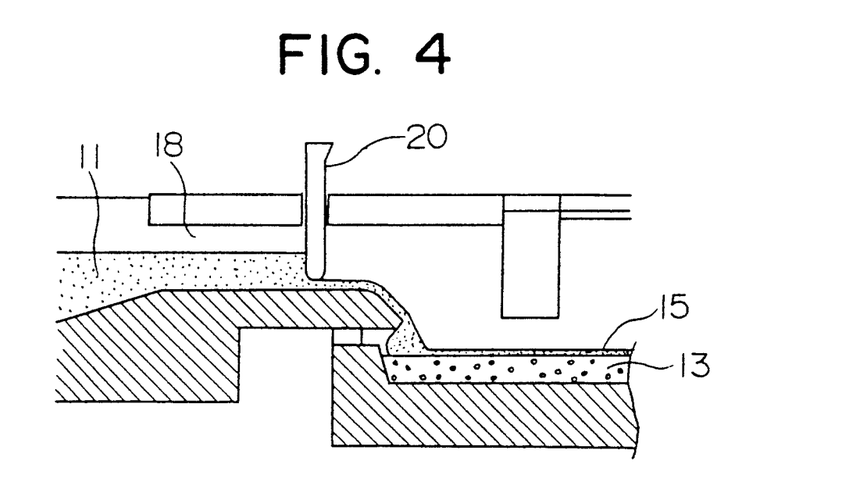
FIG. 4 is a cross-section of a tweel.

As shown in FIG. 2 that is a cross-section of the float bath 12, FIG. 3 that is a plan view of the float bath, and FIG. 4 that is a cross-section of the tweel portion, a canal 18 is a narrow and shallow water passage through which the molten glass 11 at the central part of a smelting furnace 10 is poured onto the bath 12. On the canal 18, provided is a tweel 20. The tweel 20 is a damper, made of a refractory material, used for controlling the flow of the molten glass 11 from the furnace to the float bath 12, and sealing the atmosphere in the float bath 12. The tweel 20 can be raised and lowered by remote control from the float-bath control room. While monitoring the end of the glass ribbon at the entry of the float bath and at the hot end with left and right ITV cameras 22 and 24, the operator raises and lowers the tweel 20 through remote control so as to keep the width of the glass ribbon constant at the hot end.

The prior art requires the operator to raise and lower the tweel while monitoring the ribbon width at all times to control the ribbon width because of the lack of a system for controlling the raising and lowering of the tweel.

DISCLOSURE OF INVENTION

It is an object of this invention to automate the raising and lowering of the tweel through fuzzy control, that is, by replacing human visual and judgment functions with image processing and fuzzy control.

It is another object of this invention to provide a method of controlling the width of glass ribbon in the float bath, using fuzzy control.

It is still another object of this invention to provide a system for controlling the width of glass ribbon in the float bath, using fuzzy control.

One of the problems associated with the operation of the tweel is that frequent raising/lowering operation of the tweel to increase or decrease the flow of molten glass could cause the flow of glass to fluctuate, making process operation difficult. It is crucial therefore in operating the float process to reduce the manipulation of the tweel to the lowest minimum. It is for this reason that fuzzy control according to this invention is aimed at maintaining the ribbon in a stable state without causing the ribbon edge to vibrate by minimizing the up-and-down operation of the tweel.

The basic concept of the establishment of the rules of fuzzy inference in this invention will be described in the following.

(1) Lowering the tweel

The basic requirement for lowering the tweel is that the actual overall width of the glass ribbon exceeds an aimed width. When the A-side edge of the ribbon is shifted sideways to the positive side with respect to the aimed A-side edge location, a control variable to check the state of the C-side edge of the glass ribbon is set. This control variable is divided into a negative state (SA) and a positive state (LA). If the C-side edge is in the negative state, then the glass ribbon at the hot end is judged as meandering, and as a result, the tweel is not operated. In practice, the rules for the A-side edge are not used, but only those for the C-side edge are used. (That is, priority is given to the rules for the negative state.)

If the C-side edge is in the positive state (LA) when the A-side edge is shifted sideways to the positive side with respect to the aimed A-side edge location, the actual overall width of the ribbon is judged to be larger than the aimed width, and both the rules for the A-side and C-side edges are used. In other words, if either of the A-side edge or the C-side edge is in the negative state (SA), the tweel is not lowered.

The rules for NS (Negative Small) are used when the actual ribbon is checked for its overall width and found larger than the aimed width. The rules for NM (Negative Medium) are used independently of the overall width.

(2) Raising the tweel

If either of the A-side edge or the C-side edge of the ribbon is in the negative state, the glass ribbon is also checked for its overall width. If the overall width is found small (SA), the tweel is raised. If the overall width is not small (SA), the tweel is not operated.

The rules for PS (Positive Small) are used if the overall width is found small. The rules for PM (Positive Medium) are used either after the glass ribbon is checked for its overall width, or independently of the overall width.

(3) The change rate of the ribbon edge is used as a measure for judging from which side (of the positive and negative sides) the present ribbon edge deviation begins, thereby preventing misjudgments in raising and lowering the tweel.

On the basis of the above concept, this invention is concerned with a method of controlling the width of the glass ribbon in the float bath in which the width of the glass ribbon at the hot end of the float bath is controlled at a constant value by raising or lowering the tweel for adjusting the flow of molten glass from the smelting furnace to the float bath, characterized in that the controlled value of the tweel is obtained from prescribed control variables through fuzzy inference.

Moreover, this invention contemplates the provision of a float-bath ribbon-width control system in which the width of the glass ribbon at the hot end of the float bath is controlled at a constant value by raising or lowering the tweel for adjusting the flow of molten glass from the smelting furnace to the float bath, characterized in that a fuzzy-inference means for obtaining the manipulated variable of the tweel from prescribed control variables through fuzzy inference.

BEST MODE FOR CARRYING OUT THE INVENTION

Figure 5:
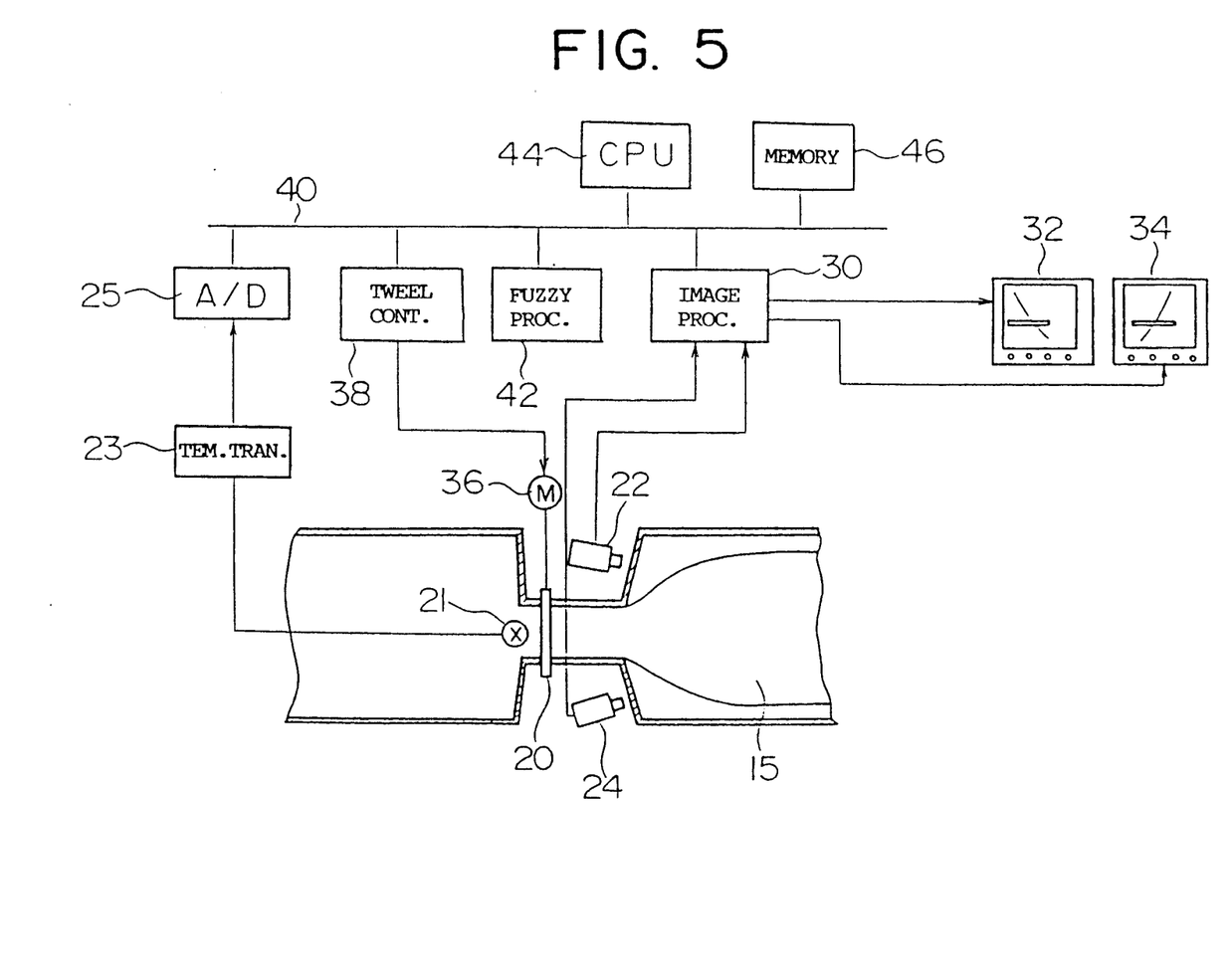
FIG. 5 is a diagram illustrating a float-bath ribbon-width control system embodying this invention.

FIG. 5 is a diagram illustrating a system for implementing the float-bath ribbon-width control method.

ITV cameras 22 (A-side) and 24 (C-side) for monitoring the width of a ribbon at the hot end are connected to an image processor (image processing board) 30, to which television monitors 32 and 34 for monitoring the A-side and the C-side are connected.

A tweel 20 is raised or lowered by a tweel drive motor 36, which is controlled by a tweel controller 38. On a canal 18 provided is a sensor 21 for sensing the canal temperature. The canal temperature sensor is connected to a temperature transducer 23, which is connected to an A/D converter 25.

The A/D converter 25, the image processor 30 and the tweel controller 38 are connected to an I/O bus 40, to which a fuzzy processor (fuzzy board) 42, a main CPU 44, and a memory 46 are connected.

The CPU 44 monitors, monitoring points at which the ribbon edge is monitored, and allows target locations on the ribbon to be controlled.

The fuzzy processor 42 carries out fuzzy operations using ten tweel control variables, which are enumerated below, while the CPU 44 operates the tweel drive motor 36 on the basis of operation results.

An example of the membership functions and rules of fuzzy operations will be described. These membership functions and rules are prepared on the basis of the operator's empirical rules. When rules are expressed by IF - - - , THEN - - - . the IF clause is termed as the antecedent, or condition section, and the THEN clause as the consequent, or conclusion section.

Now, assume that control variables are expressed by

X1: Deviation of A-side edge (the difference between the actual ribbon location and the aimed location on the A-side),
X2: Change rate of A-side edge (the estimated change rate/min in accordance with primary regression),
X3: Deviation of C-side edge (the difference between the actual ribbon location and the aimed location on the C-side),
X4: Change rate of C-side edge (the estimated change rate/min in accordance with primary regression),
X5: Change rate of canal temperature (the estimated change rate/min in accordance with primary regression),
X6: Elapsed time after the tweel is operated,
X7: Elapsed time after the smelting-furnace changing signal is generated,
X8: Control variable for checking A-side edge,
X9: Control variable for checking C-side edge,
X10: Overall width, the membership functions for the antecedent section are expressed by the grades of SA (Small), M2 (Medium 2), M3 (Medium 3), M4 (Medium 4) and LA (Large), and the membership functions for the consequent section by the grades of NB (Negative Big), NM (Negative Medium), NS (Negative small), ZO (Approximately Zero), PS (Positive Small), PM (Positive Medium), and PB (Positive Big), the rules (43 rules in total) are as follows:

(1) IF X6=SA→ZO
(2) IF X6=LA and the following table

| X2, (X4) X1, (X3) | | No changes | | Upward trend | |
|---|---|---|---|---|---|
| | SA | M2 | M3 | M4 | LA |
| SA | 40, 41 PM | 13, 26 PM | 23, 35 PS | — | — |
| M2 | 14, 27 PM | 7, 20 PS | 36, 38 PS | 8, 21 ZO | — |
| M3 | 12, 25 ZO | 6, 19 ZO | 2, 15 ZO | 3, 16 ZO | 9, 22 ZO |
| M4 | — | 5, 18 ZO | 37, 39 ZO | 4, 17 NS | 11, 24 NS |
| LA | — | — | 32, 33 NS | 10, 23 NM | 42, 43 NM |

Downward trend (for X2, (X4))

The above table means that if X1/X2 are M3/M3, the inference results are ZO and their rule number is <2>. (For X3/X4, their rule number is <15>.)

(28) IF X5=SA & X1=M3 & X2=M2 & X9=SA→PS
(29) IF X5=LA & X1=M3 & X2=M4 & X9=LA→NS
(30) IF X5=SA & X3=M3 & X4=M2 & X8=SA→PS
(31) IF X5=LA & X3=M3 & X4=M4 & X8=LA→NS

To facilitate the understanding of the rules, a list of the rules stated in more specific expressions is given below.

As for the rules (1)-(5), SA, M2, M3, M4 and LA are expressed more specifically as SA: negative, M2: slightly negative, M3: proper, M4: slightly larger, and LA: large.

As for the rules (8) and (9), SA and LA are expressed more specifically as

SA: negative state, and LA: positive state.

As for the rule (10), Sa and LA are expressed more specifically as

SA: small, and LA: large.

Figure 6:
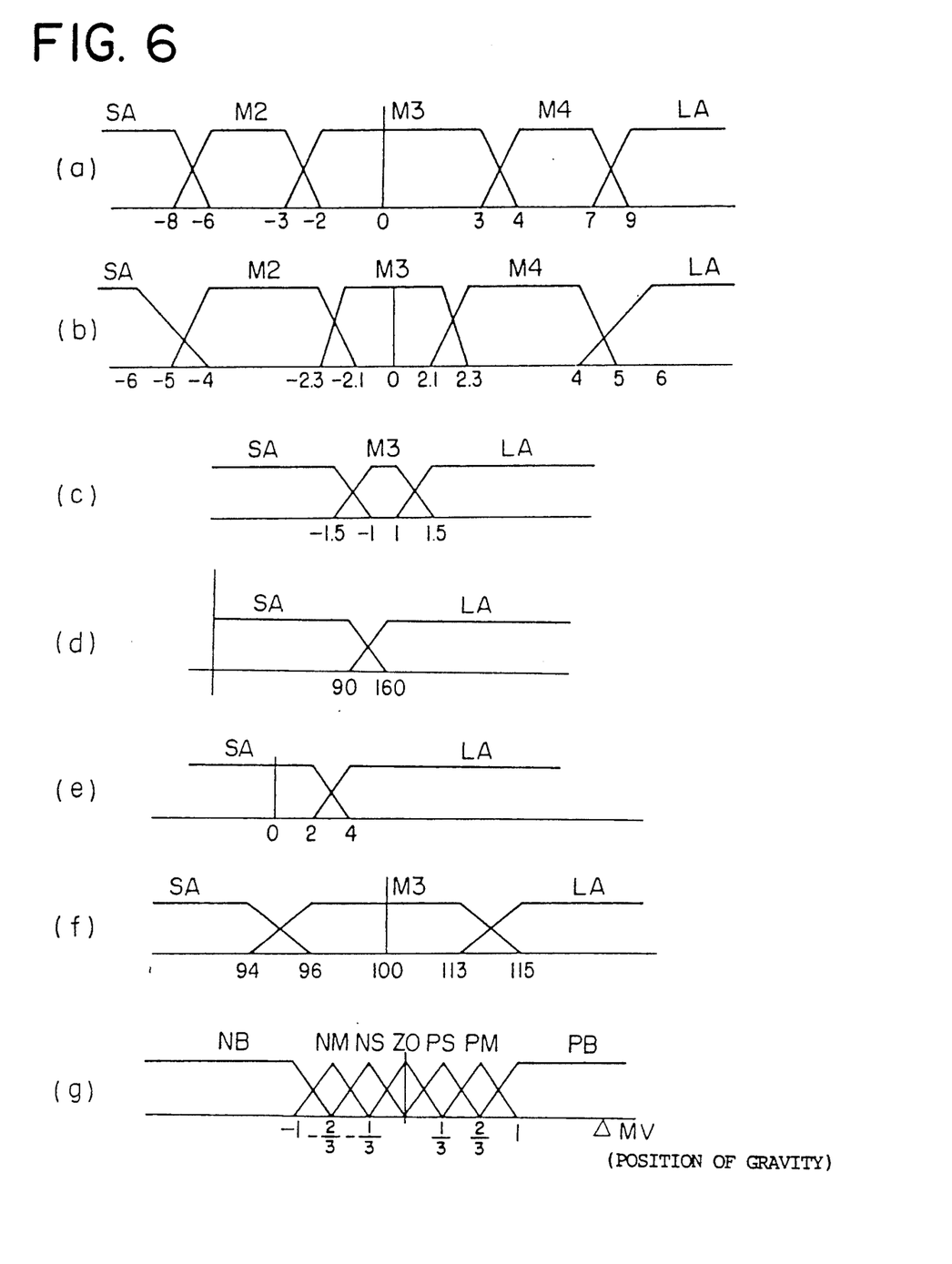
FIG. 6 is a diagram illustrating membership functions in the embodiment shown in FIG. 5.

The membership functions for X1, X3: control variables for A-side (C-side) edge deviation in the antecedent sections of the rules are shown in FIG. 6(a); the membership functions for X2, X4: control variables for A-side edge (C-side edge) change rate in the antecedent sections of the rules are shown in FIG. 6(b); the membership function for X5: the control variable for canal temperature change rate in the antecedent sections of the rules are shown in FIG. 6(c); the membership function for X6: the control variable for elapsed time after the tweel is operated in the antecedent sections of the rules are shown in FIG. 6(d); the membership functions for X8, X9: the control variables for check of A-side edge (C-side edge) in the antecedent sections of the rules are shown in FIG. 6(e); and the membership function for X10: the control variable for overall width in the antecedent sections of the rules are shown in FIG. 6(f). The membership function for the controlled value of the tweel in the consequent sections are shown in FIG. 6(g). The controlled value of the tweel is determined as follows; within which grade of the consequent section the position of the gravity of the total aggre-

LIST OF RULES

1. Within 90 seconds after the tweel is operated: ZO

The rules 2-43 below are used for cases of over 90 seconds after the tweel is operated.

| # | Condition 1 | Condition 2 | Condition 3 | Result |
|---|---|---|---|---|
| 2. | A-side edge: Proper | Width change: Proper | C-side edge: | Positive state: ZO |
| 3. | A-side edge: Proper | Width change: Slightly large | C-side edge: | Positive state: ZO |
| 4. | A-side edge: Slightly large | Width change: Slightly large | C-side edge: Overall width: | Positive state Large: NS⁻ |
| 5. | A-side edge: Slightly large | Width change: Slightly negative | C-side edge: | Positive state: ZO |
| 6. | A-side edge: Proper | Width change: Slightly negative | C-side edge: | Positive state: ZO |
| 7. | A-side edge: Slightly negative | Width change: Slightly negative | Overall width: | Small: PS⁺ |
| 8. | A-side edge: Slightly negative | Width change: Slightly large | | : ZO |
| 9. | A-side edge: Proper | Width change: Large | C-side edge: | Positive state: ZO |
| 10. | A-side edge: Large | Width change: Slightly large | C-side edge: | Positive state: NM⁻⁻ |
| 11. | A-side edge: Slightly large | Width change: Large | C-side edge: Overall width: | Positive state Large: NS⁻ |
| 12. | A-side edge: Proper | Width change: Negative | C-side edge: | Positive state: ZO |
| 13. | A-side edge: Negative | Width change: Slightly negative | | : PM⁺⁺ |
| 14. | A-side edge: Slightly negative | Width change: Negative | Overall width: | Small: PM⁺⁺ |
| 15. | C-side edge: Proper | Width change: Proper | A-side edge: | Positive state: ZO |
| 16. | C-side edge: Proper | Width change: Slightly large | A-side edge: | Positive state: ZO |
| 17. | C-side edge: Slightly large | Width change: Slightly large | A-side edge: Overall width: | Positive state Large: NS⁻ |
| 18. | C-side edge: Slightly large | Width change: Slightly negative | A-side edge: | Positive state: ZO |
| 19. | C-side edge: Proper | Width change: Slightly negative | A-side edge: | Positive state: ZO |
| 20. | C-side edge: Slightly negative | Width change: Slightly negative | Overall width: | Small: PS⁺ |
| 21. | C-side edge: Slightly negative | Width change: Slightly large | | : ZO |
| 22. | C-side edge: Proper | Width change: Large | A-side edge: | Positive state: ZO |
| 23. | C-side edge: Large | Width change: Slightly large | A-side edge: | Positive state: NM⁻⁻ |
| 24. | C-side edge: Slightly large | Width change: Large | A-side edge: Overall width; | Positive state Large: NS⁻ |
| 25. | C-side edge: Proper | Width change: Negative | A-side edge: | Positive state: ZO |
| 26. | C-side edge: Negative | Width change: Slightly negative | | : PM⁺⁺ |
| 27. | C-side edge: Slightly negative | Width change: Negative | Overall width: | Small: PM⁺⁺ |
| 28. | A-side edge: Proper | Width change: Slightly negative | Canal: C-side edge: | Negative Negative state: PS⁺ |
| 29. | A-side edge: Slightly large | Width change: Slightly large | Canal: C-side edge: | Large Positive state: NS⁻ |
| 30. | C-side edge: Proper | Width change: Slightly negative | Canal: A-side edge: | Negative Negative state: PS⁺ |
| 31. | C-side edge: Slightly large | Width change: Slightly large | Canal: A-side edge: | Large Positive state: NS⁻ |
| 32. | A-side edge: Large | Width change: Proper | C-side edge: | Positive state: NM⁻⁻ |
| 33. | C-side edge: Large | Width change: Proper | A-side edge: | Positive state: NM⁻⁻ |
| 34. | A-side edge: Negative | Width change: Proper | Overall width: | Small: PM⁺⁺ |
| 35. | C-side edge: Negative | Width change: Proper | Overall width: | Small: PM⁺⁺ |
| 36. | A-side edge: Slightly negative | Width change: Proper | Overall width: | Small PS⁺ |
| 37. | A-side edge: Slightly large | Width change: Proper | C-side edge: | Positive state: ZO |
| 38. | C-side edge: Slightly negative | Width change: Proper | Overall width: | Small: PS⁺ |
| 39. | C-side edge: Slightly large | Width change: Proper | A-side edge: | Positive state: ZO |
| 40. | A-side edge: Negative | Width change: Negative | | : PM⁺⁺ |
| 41. | C-side edge: Negative | Width change: Negative | | : PM⁺⁺ |
| 42. | A-side edge: Large | Width change: Large | C-side edge: | Positive state: NM⁻⁻ |
| 43. | C-side edge: Large | Width change: Large | A-side edge: | Positive state: NM⁻⁻ | gated areas of triangles of the consequent sections obtained for each rule falls (min-max synthesis). ΔMV in FIG. 6(g) represents the center of gravity or centroid of the resulting aggregated area.

With the float-bath ribbon-width control system having the aforementioned construction, the membership functions described above and the rules (1)-(43) are preset in the fuzzy processor 42, and the controlled value of the tweel is inferred from the control variables X1-X10, and the inference results are fed to the CPU 44.

In the following, the operation will be described in detail. The monitoring point of the ribbon edge and the aimed ribbon position to be controlled are set in the CPU 44.

The ITV camera 22 and 24 on both sides of the bath hot end monitor the edge of the glass ribbon, and the image processor initiates the ribbon edge processing, detects and feeds the ribbon edge to the CPU 44 via the I/O bus 40.

The canal temperature (1,000°-1,300° C.) detected by the canal temperature sensor 21, on the other hand, is converted into a d-c voltage in the temperature transducer 23, and the resulting d-c voltage is further converted into digital values in the A/D converter to feed to the CPU 44 via the I/O bus 40.

The CPU 44 obtains the A-side edge deviation X1, the A-side edge change rate X2, the C-side edge deviation X3, the C-side edge change rate X4, the canal temperature change rate X5, the elapsed time after the tweel is operated X6, the elapsed time after the smelting-furnace changing signal is generated X7, the control variable for the check of A-side edge X8, the control variable for the check of C-side edge X9, and the overall width X10, and enters them as control variables to the fuzzy processor 42. In the fuzzy processor 42, fuzzy inference of the controlled values is performed based on the present membership functions and the rules (1)-(43). The fuzzy inference is performed with the min-max synthesis method, as noted earlier, the outputs are converted, and the instructions for raising and lowering the tweel is output to the CPU 44. The CPU 44 operates the tweel drive motor 36 on the basis of the inference results. In this way, the main CPU 44 is free from the load of fuzzy inference operations since fuzzy inference is performed solely by the fuzzy processor 42.

A typical example of the output results in fuzzy inference will be described, referring to the membership functions in FIG. 6(g). The raising and lowering of the tweel and the number of raising/lowering operations are determined by the value of Δ (gravity position).

```
−1 ≦ ΔMV < −5/6: Raise the tweel thrice.
−5/5 ≦ ΔMV < −3/6: Raise the tweel twice.
−3.6 ≦ ΔMV < −1/6: Raise the tweel once.
−1/6 ≦ ΔMV < 1/6: No action
1/6 ≦ ΔMV < 3/6: Lower the tweel once.
3/6 ≦ ΔMV < 5/6: Lower the tweel twice.
5/6 ≦ ΔMV < 1: Lower the tweel thrice.
```

Figure 7:
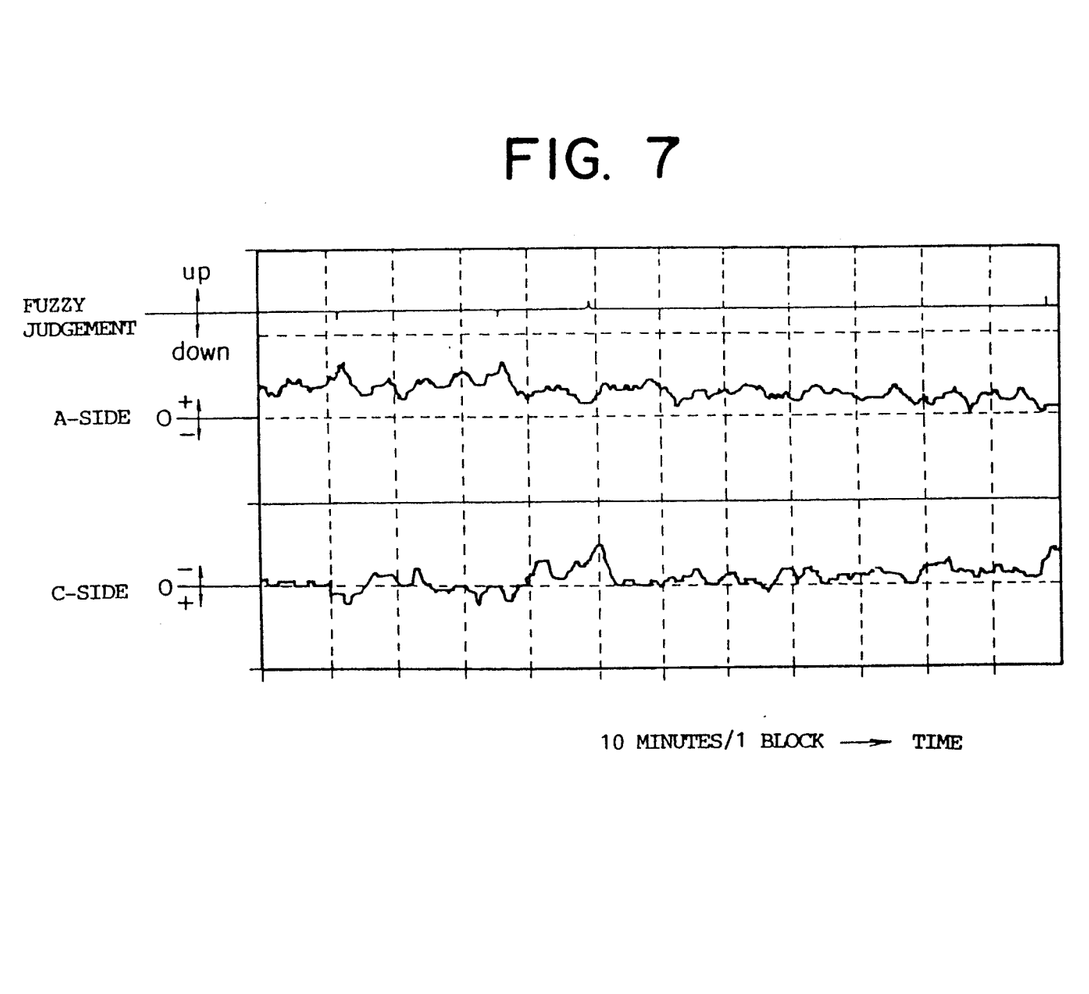
FIG. 7 is a graph illustrating the control results obtained in the embodiment shown in FIG. 6.

The results of the control of the float-bath ribbon width in this embodiment are shown in FIG. 7. With the thickness of 6.00 mm and the canal temperature of 1,116° C., the tweel was lowered twice and raised twice. The excess spread of the ribbon was controlled within +0.6 inches on one side, while the insufficient spread was controlled within −0.4 inches on one side. A substantially stable operating condition was realized, in which the tweel remained unoperated for as long as over 20 minutes.

In the above embodiment, the following control variables for fuzzy processing were selected; A-side edge deviation, A-side edge change rate, C-side edge deviation, C-side edge change rate, canal temperature change rate, elapsed time after the tweel is operated, elapsed time after smelting-furnace changing signal is produced, check of A-side edge, check of C-side edge, and overall width. This invention, however, is not limited to them, and control variables may be increased or decreased. The minimum required control variables include A-side edge deviation, A-side edge change rate, C-side edge deviation, C-side edge change rate, canal temperature change rate, and elapsed time after the tweel is operated. When control variables are increased, canal temperature control of higher accuracy can be accomplished by adding molten glass charge change rate, glass feed rate in the Lehr (annealing oven), etc. to control variables. When the amount of molten glass charge is increased sharply, the response time of control tends to be shortened, so control operations have to be carried out a little earlier.

Although one fuzzy processor is used in the above embodiment, control accuracy can be further improved by providing a plurality of fuzzy processors, setting the rules and/or the membership functions in individual fuzzy processors in accordance with the state of process, and selecting the outputs of the fuzzy processors in accordance with changes of the process.

Figure 8:
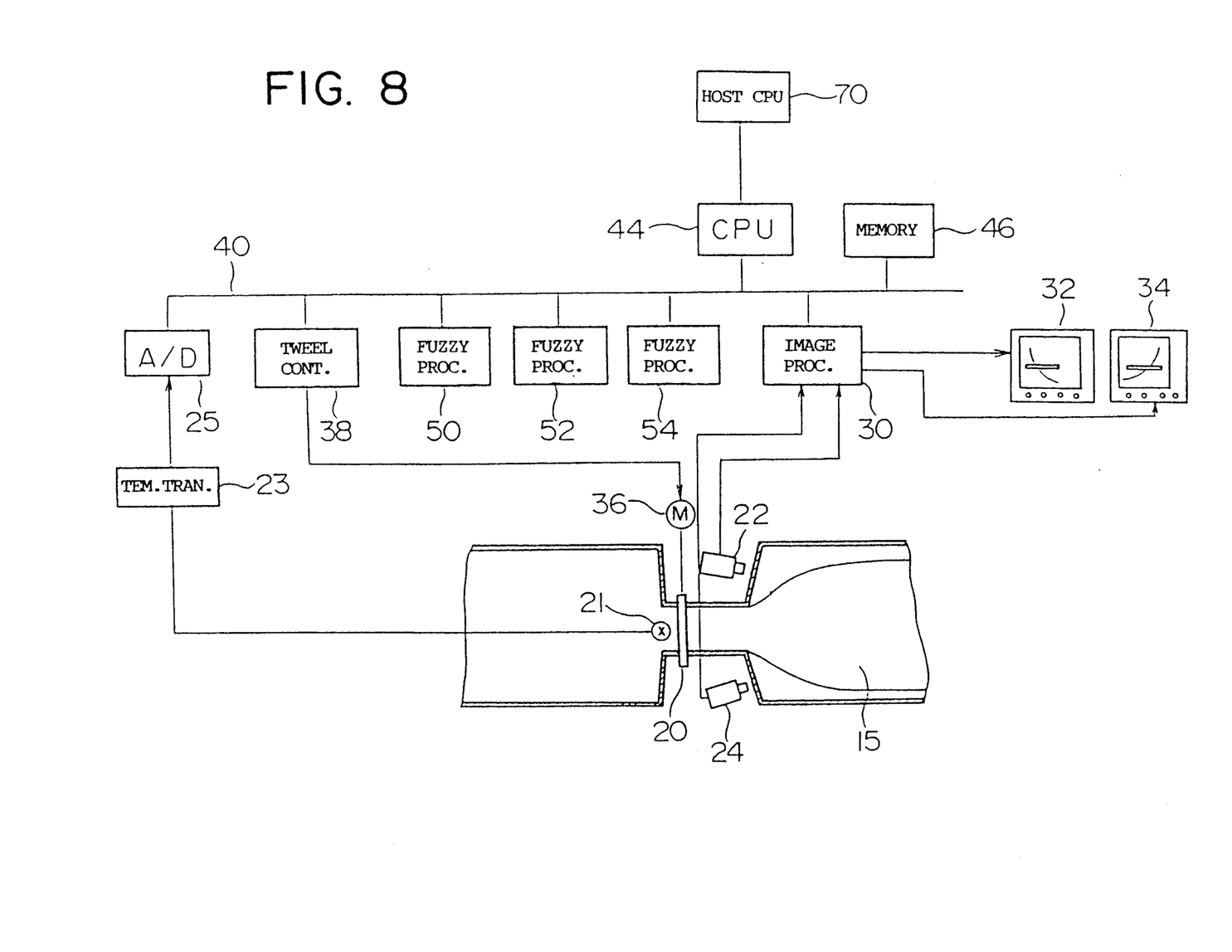
FIG. 8 is a diagram illustrating another embodiment of the float-bath ribbon-width control system of this invention.

FIG. 8 shows an example of the float-bath ribbon-width control system having a plurality of fuzzy processors. In this example, three fuzzy processors 50, 52 and 54 are provided, and the CPU 44 is connected to a host CPU 70. different rules and/or membership functions are set in advance in these fuzzy processors 50, 52 and 54 in accordance with the state of process, and each fuzzy processor carries out fuzzy inference in parallel. Inference outputs necessary for achieving the optimum control are selected in accordance with the state of process.

What is needed in the multi-fuzzy system of this type is just selecting the inference results of the fuzzy board so software can be easily designed.

INDUSTRIAL APPLICABILITY

This invention makes it possible to fully automate the control of glass ribbon width in the float glass manufacturing process that has heretofore been operated manually by using fuzzy control.

We claim:

1. In a glass manufacturing system in which molten glass, having a temperature, flows from a canal into a float bath, said float bath having first and second sides, at a rate determined by a tweel, to produce a ribbon of molten glass, which ribbon has first and second edges that define a width, a method for controlling the width of the glass ribbon in the float bath to maintain the width of the ribbon at a substantially constant value by raising and lowering the tweel to adjust the flow of the molten glass into said float bath, characterized in that the tweel is controlled through fuzzy inference using predetermined control variables including:

deviation of the first edge of the ribbon from a first desired position relative to the first side of the float bath, deviation of the second edge of the ribbon from a second desired position relative to the second side of the float bath, and the temperature of the molten glass in the canal.

2. A method as set forth in claim 1 wherein said control variables further include:

rate of change of the position of the first edge of the ribbon relative to the first desired position, rate of change of the position of the second edge of the ribbon relative to the second desired position, rate of change of the canal temperature, and a measure of time since said tweel was last raised or lowered.

3. A method as set forth in claim 2 wherein the molten glass flows into the canal from a smelting furnace which is responsive to a changing signal to change the temperature of the molten glass in the canal, and said control variables further include:

a measure of time since the last smelting-furnace changing signal was generated, the position of the first edge of the ribbon, the position of the second edge of the ribbon, and the width of the ribbon.

4. A float-bath ribbon-width control method as set forth in any of claims 1-3 wherein the control variables define a state of the glass manufacturing system and a plurality of fuzzy processors are provided for performing fuzzy inference the fuzzy processors having output signals which are selected in accordance with the state of the glass manufacturing system by defining different rules and membership functions in said fuzzy processors.

5. In a glass manufacturing system in which molten glass, having a temperature, flows from a canal into a float bath, said float bath having first and second sides, at a rate determined by a tweel, to produce a ribbon of molten glass, which ribbon has first and second edges that define a width, apparatus for controlling the width of the glass ribbon in the float bath to maintain the width of the ribbon at a substantially constant value by raising and lowering the tweel to adjust the flow of the molten glass into said float bath, the apparatus comprising:

means for providing a measure of deviation of the first edge of the ribbon from a first desired position relative to the first side of the float bath as a first predetermined control variable, means for providing a measure of deviation of the second edge of the ribbon from a second desired position relative to the second side of the float bath as a second predetermined control variable, means for providing a measure of the temperature of the molten glass in the canal as a third predetermined control variable, and control means, including fuzzy inference means, which is responsive to the first, second and third predetermined control variables for determining when the tweel is to be raised or lowered.

6. Apparatus as set forth in claim 5 further including:

means for providing a measure of rate of change of the position of the first edge of the ribbon relative to the first desired position as a fourth predetermined control variable, means for providing a measure of rate of change of the position of the second edge of the ribbon relative to the second desired position as a fifth predetermined control variable, means for providing a measure of rate of change of the canal temperature as a sixth predetermined control variable, and means for providing a measure of time since said tweel was last raised or lowered as a seventh predetermined control variable, wherein the control means is further responsive to the fourth, fifth, sixth and seventh predetermined control variables for determining when the tweel is to be raised and lowered.

7. Apparatus as set forth in claim 6 wherein the molten glass flows into the canal from a smelting furnace responsive to a changing signal to change the temperature of the molten glass in the canal, and said apparatus further includes:

means for providing a measure of time since the last smelting-furnace changing signal was generated as an eighth predetermined control variable, means for providing a measure of the position of the first edge of the ribbon as a ninth predetermined control variable, means for providing a measure of the position of the second edge of the ribbon as a tenth predetermined control variable, and means, responsive to the ninth and tenth predetermined control variables, for providing a measure of the width of the ribbon as an eleventh predetermined control variable, wherein the control means is further responsive to the eighth, ninth, tenth and eleventh predetermined control variables for determining when the tweel is to be raised and lowered.

8. Apparatus as set forth in any of claims 5-7 wherein the predetermined control variables define a state of the glass manufacturing system, the apparatus further comprising a plurality of fuzzy processors, provided to perform fuzzy inference, the fuzzy processors having output signals, the apparatus further comprising means for selecting ones of said output signals in accordance with the state of the glass manufacturing system in accordance with respectively different rules and membership functions in said plurality of fuzzy processors.

* * * * *